No. 656,316. Patented Aug. 21, 1900.
L. W. BUGBEE.
EYEGLASSES.
(Application filed Mar. 17, 1900.)

(No Model.)

Witnesses
Jos. A. Ryan

Inventor
Lucian W. Bugbee.

Attorney

UNITED STATES PATENT OFFICE.

LUCIAN WILLIS BUGBEE, OF SOUTHBRIDGE, MASSACHUSETTS, ASSIGNOR TO THE SOUTHBRIDGE OPTICAL COMPANY, OF SAME PLACE.

EYEGLASSES.

SPECIFICATION forming part of Letters Patent No. 656,316, dated August 21, 1900.

Application filed March 17, 1900. Serial No. 9,057. (No model.)

*To all whom it may concern:*

Be it known that I, LUCIAN WILLIS BUGBEE, a citizen of the United States, residing at Southbridge, in the county of Worcester and State of Massachusetts, have invented certain new and useful Improvements in Eyeglasses, of which the following is a specification, reference being had therein to the accompanying drawings.

My invention relates to improvements in eyeglasses; and the object of my invention is the provision of a simple, inexpensive, attractive, and practical means for securing the lens-frames to the bow and nosepieces, which will positively prevent accidental detachment of the lens-frames under any circumstances.

To attain the desired object, my invention consists in a novel and peculiar lock-screw for securing the lens-frames to the bow, as will fully appear from the following description and accompanying drawings.

Figure 1:
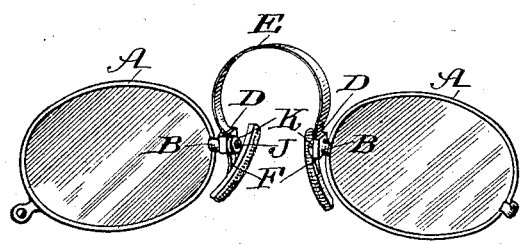
Figure 2:
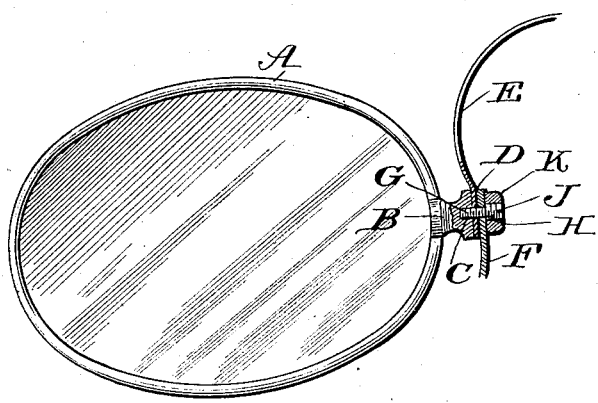
Figure 3:
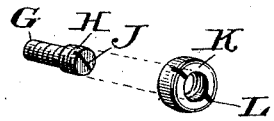
Figure 3:

Figure 1 represents a perspective view of a pair of eyeglasses provided or equipped with my improvement. Fig. 2 represents a sectional view of one-half of a pair of eyeglasses to clearly show the details of construction of my lock-screw, and Fig. 3 represents an enlarged detail view of the lock-screw.

In the drawings, A designates the lens-frames, of well-known form, provided with the usual posts or studs B, having the threaded sockets C and the channel or groove D, in which fits the bow E, carrying the nosepieces F, in connection with which parts my invention is employed.

My invention is of extremely-simple construction and comprises the stem having the lower reduced screw portion G and the upper enlarged screw portion or head H, which is provided with the slot J to receive a screw-driver for forcing the reduced screw portion G home into the threaded sockets C of the posts, and engaging the upper enlarged screw portion or head H is the locking-nut K, which has the kerf or slot L to receive a screw-driver for forcing the locking-nut down upon the head, as is obvious.

From the foregoing description, taken in connection with the drawings, it is evident that I provide a locking-screw which will firmly connect the lens-frames to the bow and prevent accidental detachment under any condition and which locking means by reason of its ornamental appearance, its simplicity, inexpensiveness, and durability will commend itself as a thoroughly-practical improvement for the intended purpose.

I claim—

In an eyeglass, the combination with the lens-frames and bow carrying the nosepieces, of the threaded stem having the threaded lower reduced end and the upper enlarged threaded head, and the locking-nut for engaging said enlarged threaded head to lock the same.

In testimony whereof I affix my signature in presence of two witnesses.

LUCIAN WILLIS BUGBEE.

Witnesses:
BENAJAH L. BUGBEE,
PHILIP A. CROSS.